(12) United States Patent
Yamamoto et al.

(10) Patent No.: US 8,550,500 B2
(45) Date of Patent: Oct. 8, 2013

(54) UTILITY VEHICLE

(75) Inventors: Teruaki Yamamoto, Kakogawa (JP); Itsuo Takegami, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 72 days.

(21) Appl. No.: 13/338,854

(22) Filed: Dec. 28, 2011

(65) Prior Publication Data

US 2013/0168951 A1  Jul. 4, 2013

(51) Int. Cl.
*B60R 22/34* (2006.01)
*B60R 22/12* (2006.01)
*B60R 21/13* (2006.01)

(52) U.S. Cl.
USPC ............ 280/807; 280/749; 280/756; 297/474

(58) Field of Classification Search
USPC .............. 280/807, 749, 748, 756, 801.2, 808; 296/146.5, 146.6; 297/476, 479, 474, 483
See application file for complete search history.

(56) References Cited

U.S. PATENT DOCUMENTS

| 6,905,159 | B1 | 6/2005 | Saito et al. |
|---|---|---|---|
| 6,994,388 | B2 | 2/2006 | Saito et al. |
| 7,249,798 | B2 | 7/2007 | Saito et al. |
| 7,651,134 | B2 * | 1/2010 | Rosso ........................ 280/801.1 |

FOREIGN PATENT DOCUMENTS

JP          61-024649        *    2/1986

* cited by examiner

*Primary Examiner* — Drew Brown
(74) *Attorney, Agent, or Firm* — Wenderoth, Lind & Ponack, L.L.P.

(57) ABSTRACT

A utility vehicle according to the present invention includes a ROPS, a front seat and a rear seat arranged in a riding space, a cargo bed changeable between an expanded state in which the cargo bed is expanded forward into the riding space and a non-expanded state in which the cargo bed is not expanded in the riding space, and a plurality of seatbelt apparatuses for all passengers including a driver, wherein each of the seatbelt apparatuses is a three point seatbelt apparatus including a webbing, a bottom anchor, a top anchor, a lower buckle and a retractor, and in at least one of the three point seatbelt apparatuses, the top anchor is provided on a cross member of the ROPS.

8 Claims, 14 Drawing Sheets

UTILITY VEHICLE

BACKGROUND OF THE INVENTION

1. Field of the Invention

The present invention relates to a utility vehicle in which a cargo bed can be expanded forward so as to utilize an area or a capacity of a cargo bed space and a riding space to a maximum extent according to need of a user.

2. Description of the Related Art

The present applicant filed applications of the inventions relating to a utility vehicle having a cargo bed in which an area or a capacity can be expanded, and those applications have already been registered. Examples include U.S. Pat. Nos. 6,905,159, 6,994,388, and 7,249,798.

In utility vehicles shown in the above documents, a front seat and a rear seat are arranged in a riding space covered by a ROPS, and a cargo bed is arranged behind the rear seat. By changing the rear seat from a use state to a stowed state, a front part of the cargo bed can be expanded into the riding space which is occupied by the rear seat in the use state.

Such a utility vehicle is generally equipped with as many seatbelt apparatuses as the fixed number of passengers.

SUMMARY OF THE INVENTION

The present invention is to provide a utility vehicle in which a riding space is surrounded by a ROPS, a rear seat is freely stowed, a cargo bed can be expanded forward, compact three point seatbelt apparatuses are provided for all seating areas (seat areas), and the rear seat can be stowed without uselessly taking out a seatbelt for the rear seat.

In order to achieve the above, the present invention is a utility vehicle including ROPS including a plurality of frame members surrounding a riding space, a front seat and a rear seat arranged in the riding space, a cargo bed provided behind the riding space, the cargo bed being changeable between an expanded state in which the cargo bed is expanded forward into the riding space and a non-expanded state in which the cargo bed is not expanded in the riding space, and a plurality of seatbelt apparatuses for all passengers including a driver, wherein each of the seatbelt apparatuses is a three point seatbelt apparatus including a webbing integrally having a lap belt and a shoulder belt, a bottom anchor, a top anchor, a lower buckle and a retractor, in which the webbing is supported by the bottom anchor, the top anchor and the buckle at three points and one end of the webbing is winded around the retractor, and in at least one of the three point seatbelt apparatuses, the top anchor is provided on a cross member extending in the vehicle width direction among the frame members of the ROPS.

According to the above configuration, even when the rear seat is freely stowed, the three point seatbelt apparatuses can be provided. Since seatbelts are not longer than necessary, an outer appearance can be maintained, material cost can be saved, and the retractor can be downsized.

In the above utility vehicle, the following structures can be preferably adopted.

(a) At least one of the front seat and the rear seat has a three-seater structure, and the three point seatbelt apparatus having the top anchor supported by the cross member is arranged in a central seating area among three seating areas of the three-seater seat.

According to the above configuration, the three point seatbelt apparatus can be provided in the central seating area of the three-seater seat.

(b) The three-seater seat is a folding type rear seat in which a backrest is capable of being folded and accommodated at a front position of the rear seat, and the cross member supporting the top anchor is arranged at a position lower than an upper end of the ROPS in a rear part of the ROPS.

According to the above configuration, the cross member serving as a member for attaching the top anchor is arranged on the lower side of the upper end of the ROPS. Thus, the top anchor can be attached at height around a shoulder of the seated passenger, for example. Thereby, length of the seatbelts can be prevented from being long. Since there is no need for extending the seatbelts longer than necessary, the outer appearance can be favorably maintained, and the entire seatbelt apparatus and the retractor can be compactified.

(c) The three-seater seat is the rear seat, and the bottom anchor of the three point seatbelt apparatus arranged in the central seating area of the rear seat is arranged on the opposite side of the driver seating area side in the vehicle width direction of the front seat with respect to the central seating area.

According to the above configuration, when the rear seat is stowed, the seatbelt in the central seating area is accommodated in a space which is away from a driver, so as not to disturb driving.

(d) An upper part of a screen is supported by the cross member.

According to the above configuration, a support member of the screen and a support member of the top anchor of the seatbelt apparatus can be unified, so that the number of parts is reduced.

(e) A plurality of headrests is provided on the cross member.

According to the above configuration, a support member of the headrest and a support member of the top anchor of the seatbelt apparatus can be unified, so that the number of parts is reduced.

DETAILED DESCRIPTION OF THE INVENTION

Based on FIGS. 1 to 20, an embodiment of the present invention will be described.

[Entire Structure of Vehicle]

Figure 1:
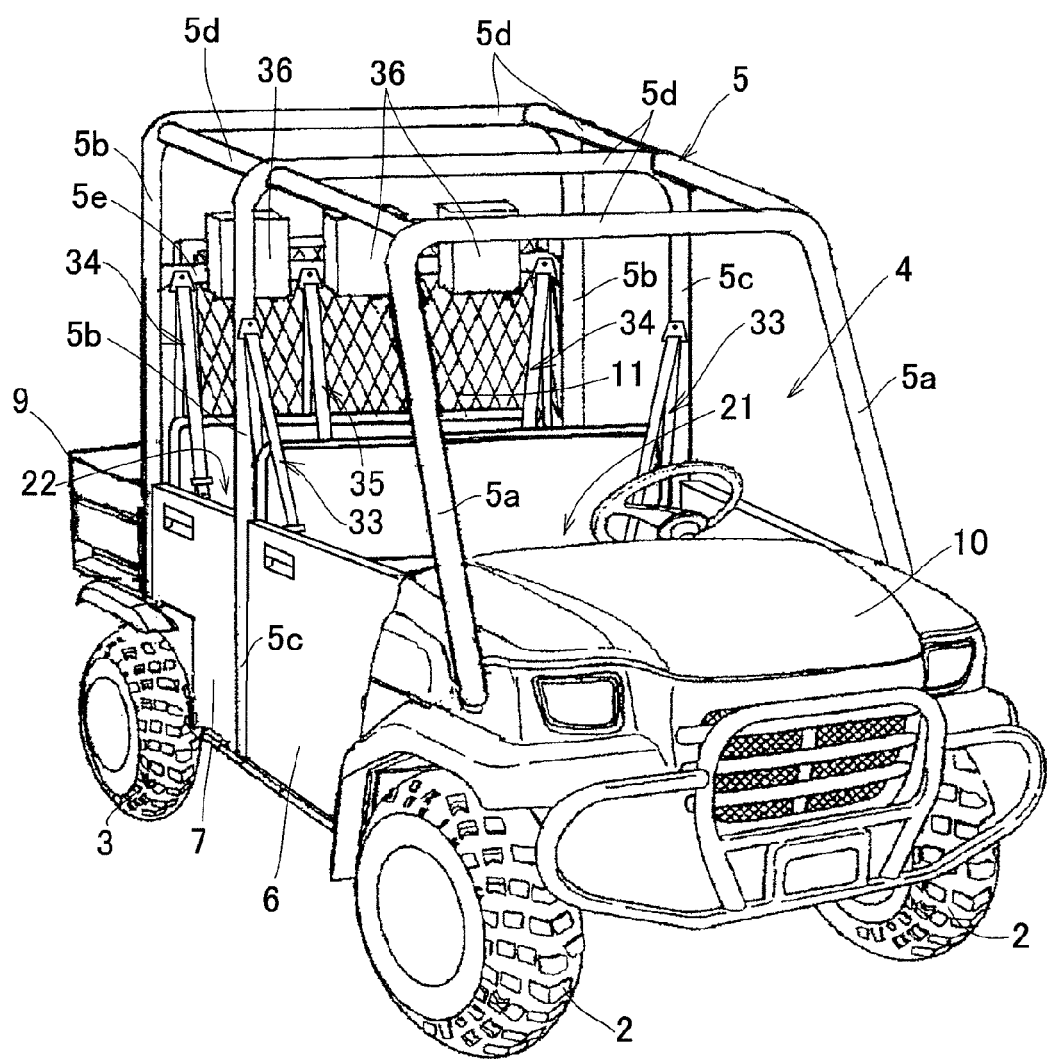
FIG. 1 is a perspective view of a utility vehicle according to the present invention.

FIG. 1 is a perspective view of an entire utility vehicle according to the present invention. The utility vehicle is provided with a pair of left and right front wheels 2 in a front part of a vehicle body, a pair of left and right rear wheels 3 in a rear part of the vehicle body, and a riding space (cabin) 4 between the front wheels 2 and the rear wheels 3. The riding space 4 is surrounded by a ROPS 5, a pair of front doors 6 and a pair of rear doors 7. Further, an expandable cargo bed 9 is provided behind the riding space 4, a bonnet 10 is provided in front of the riding space 4, and a screen 11 is provided in a front end of the cargo bed 9.

Figure 2:
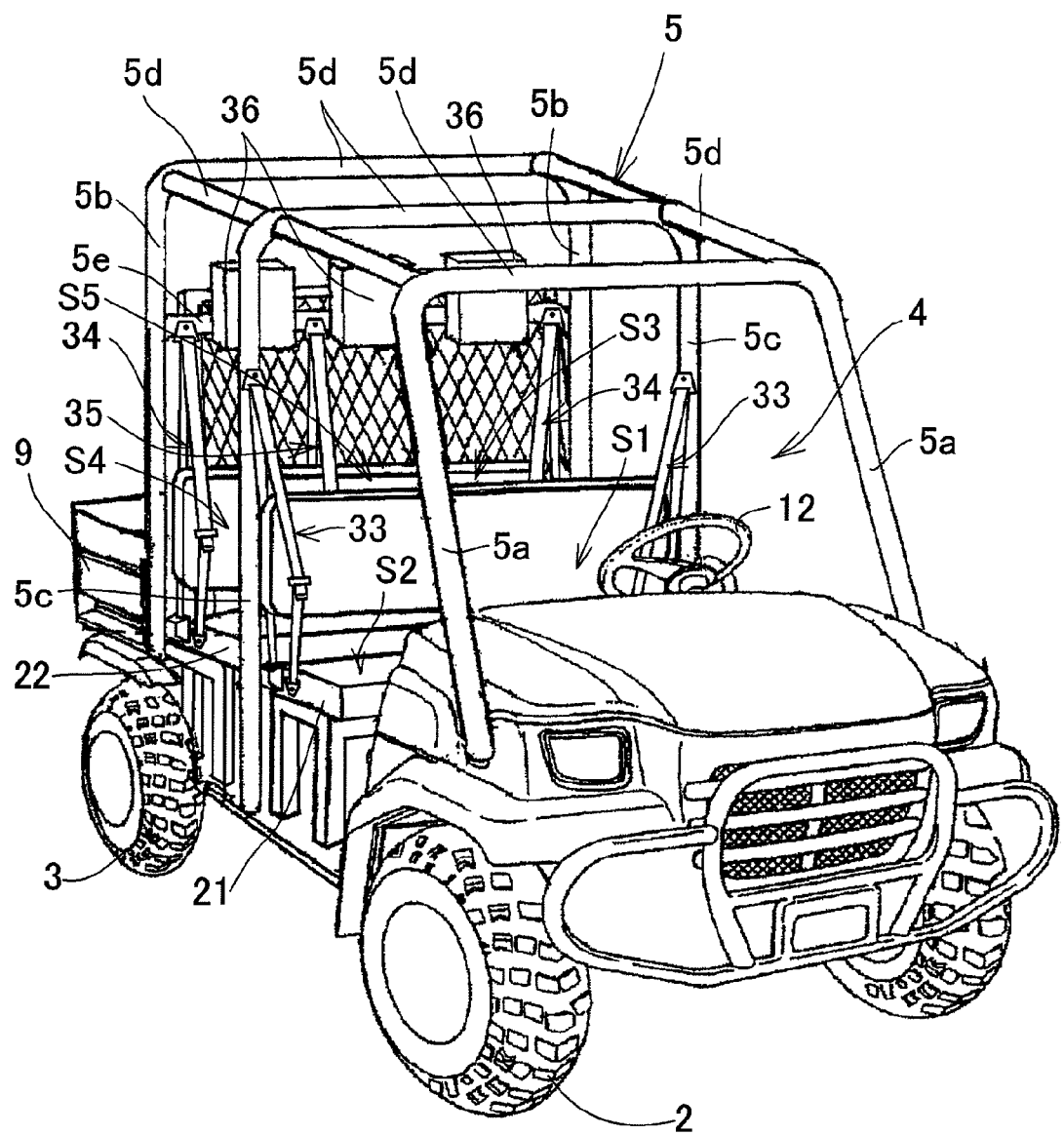
FIG. 2 is a perspective view of the same utility vehicle as FIG. 1 shown as doors are removed.

FIG. 2 is a perspective view of the utility vehicle shown as the front and rear doors 6, 7 are removed. A bench type front seat 21 is installed in a front half part of the riding space 4, and a bench type stowable rear seat 22 is installed in a rear half part of the riding space 4. In the embodiment, the bench type front seat 21 is two-seater, and three point seatbelt apparatuses 33 are respectively provided in left and right seating areas S1, S2 of the front seat 21. The left seating area S1 of the front seat 21 is a driver seat, and an operation portion such as a handle 12 is provided in front of the left seating area S1. The bench type rear seat 22 is three-seater. Three point seatbelt apparatuses 34 are respectively provided in left and right seating areas S3, S4 of the rear seat 22, and, further, a three point seatbelt apparatus 35 is also provided in a central seating area S5.

[Configuration of ROPS 5]

The ROPS 5 is an abbreviation of a rollover protective structure provided with a pair of left and right front vertical members 5a, a pair of left and right rear vertical members 5b, a pair of left and right intermediate vertical members 5c arranged between the front vertical members 5a and the rear vertical members 5b, and a plurality of upper end beam members 5d for coupling upper ends of the vertical members 5a, 5b, 5c. Further, a cross member 5e extending in the vehicle width direction is integrally formed in the pair of left and right rear vertical members 5b. The cross member 5e is arranged at a position lower than the upper end beam members 5d. Specifically, the cross member 5e is arranged at height corresponding to a shoulder or a neck of a passenger seated on the rear seat 22 (refer to FIG. 6), and three headrests 36 for the rear seat are provided in the cross member 5e.

[Configuration of Cargo Bed 9]

Figure 3:
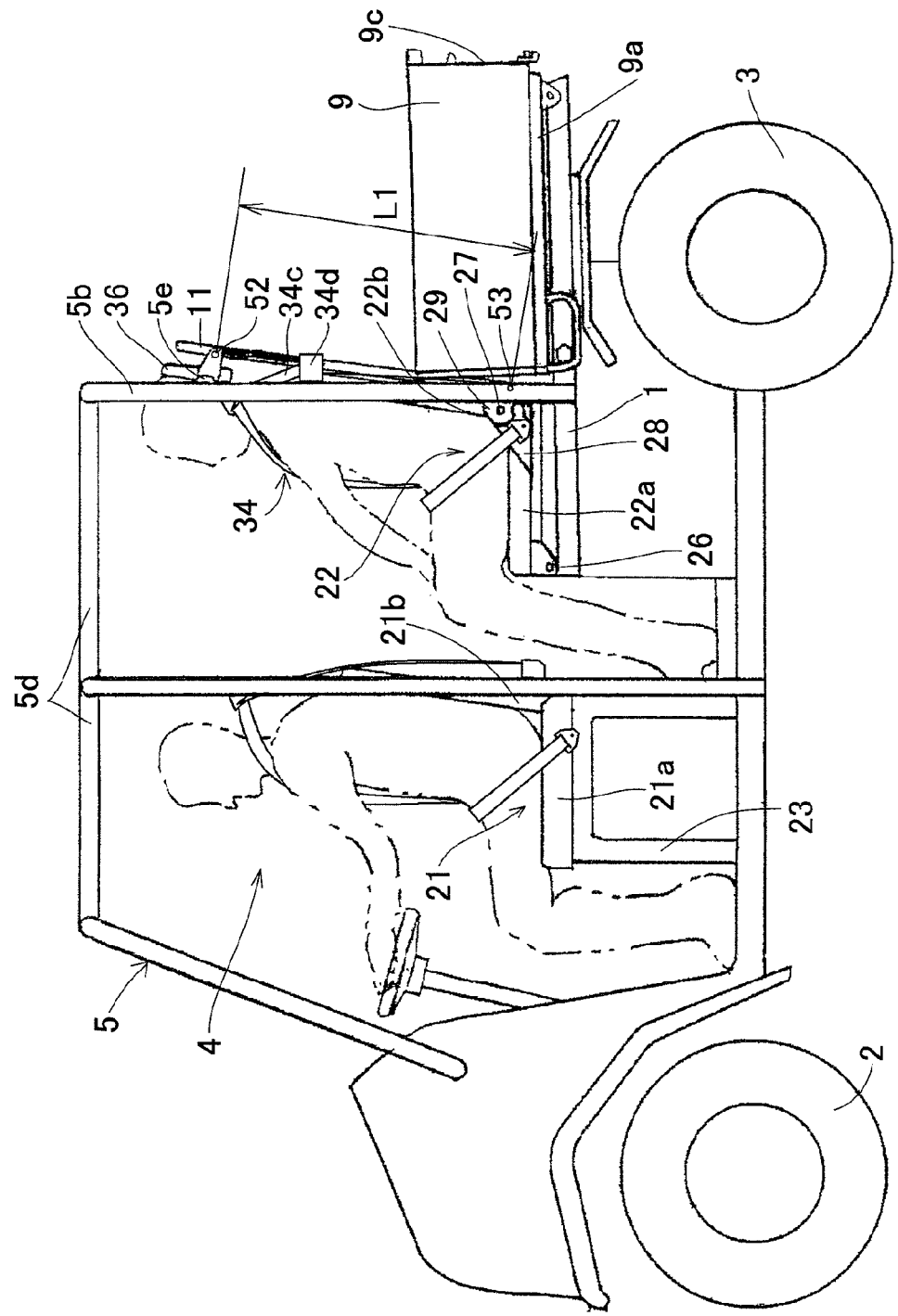
FIG. 3 is a left side view of the utility vehicle of FIG. 1 at the time of non-expansion of a cargo bed.
Figure 4:
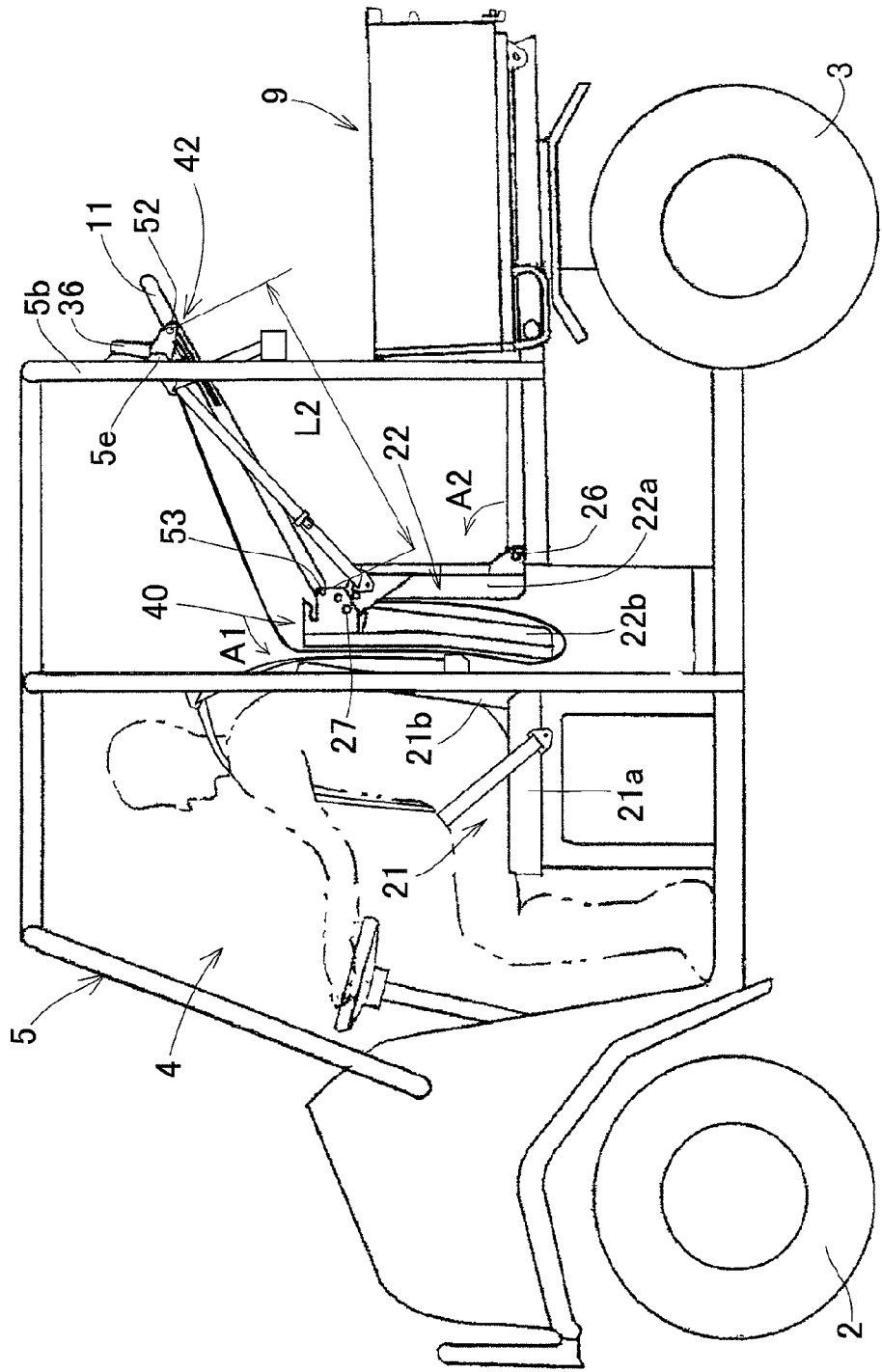
FIG. 4 is a left side view of the utility vehicle of FIG. 1 at the time of expansion of the cargo bed.

FIG. 3 is a left side view of the utility vehicle in a non-expanded state of the cargo bed 9, and FIG. 4 is a left side view of the utility vehicle in an expanded state of the cargo bed 9. In FIG. 3, the cargo bed 9 is provided with a bottom wall 9a, left and right side walls 9b and a rear wall 9c. At the time of the non-expanded state of the cargo bed 9, the stowable rear seat 22 is in a use state (a state that the passenger can be seated).

In FIG. 4, at the time of the expanded state of the cargo bed 9, the rear seat 22 is folded and stowed immediately behind the front seat 21.

[Configuration of Front Seat 21]

In FIG. 3, the bench type front seat 21 is provided with one rectangular seat bottom 21a elongated in the lateral direction and one rectangular backrest 21b elongated in the lateral direction. The seat bottom 21a and the backrest 21b are fixed to support legs 23.

[Configuration of Rear Seat 22]

In FIG. 3, the bench type stowable rear seat 22 is provided with one rectangular seat bottom 22a elongated in the lateral direction, one rectangular backrest 22b and the three headrests 36. As described above, the rear seat 22 is formed in such a manner that a position thereof is changeable between the use state that the passenger can be seated while facing forward (FIG. 3) and a stowed state that the rear seat is stowed on the back of the backrest 21b of the front seat 21 (FIG. 4). A specific folding structure will be described. A front end of the seat bottom 22a of the rear seat 22 is pivotably supported by a vehicle body frame 1 via a front hinge 26, and a lower end of the backrest 22b is pivotably coupled to a rear end of the seat bottom 22a via a rear hinge 27. The rear hinge 27 provides pivotable coupling between a metal seat bottom side bracket 28 secured to the rear end of the seat bottom 22a and a metal backrest side bracket 29 secured to the lower end of the backrest 22b.

As shown in FIG. 4, in a state that the rear seat 22 is stowed, the backrest 22b is pivoted anticlockwise (in the arrow A1 direction) on the rear hinge 27 and abutted with a surface of the seat bottom 22a, and the seat bottom 22a is pivoted anticlockwise (in the arrow A2 direction) on the front hinge 26 and brought into a substantially vertical state at a rear position of the backrest 21b of the front seat 21. That is, since the backrest 22b is folded on the rear hinge 27 so as to be substantially parallel to the seat bottom 22a and further, the backrest 22b in a folded state and the seat bottom 22a are pivoted front-upward on the front hinge 26, the rear seat 22 is changed into the standing stowed state as in FIG. 4.

A pair of lock mechanisms 40 is provided in left and right ends of the rear seat 22 so as to lock the rear seat 22 in the use state.

[Lock Mechanism 40 of Rear Seat 22]

Figure 15:
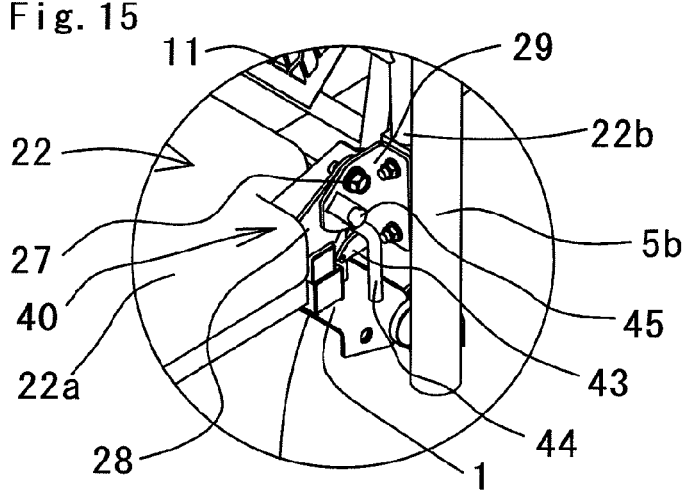
FIG. 15 is a perspective view of a lock mechanism of the rear seat in a use state.

FIG. 15 shows the left lock mechanism 40 of the rear seat 22. The lock mechanism 40 is provided with a hook 43 for locking the backrest 22b in the use state (standing state) onto the vehicle body frame 1, a U shape anchor (hook receiver) 44 provided in the vehicle body frame 1 so as to be engageable with the hook 43, and a lock pin 45 for fixing the seat bottom 22a to the backrest 22b.

The hook 43 is formed in a lower end of the bracket 29 of the backrest 22b integrally with the bracket 29, protrudes forward, and is engaged with an upper end beam part of the anchor 44 from behind. By engaging the hook 43 with the anchor 44, the backrest 22b is maintained in the standing state (use state) with respect to the vehicle body frame 1.

Figure 17:
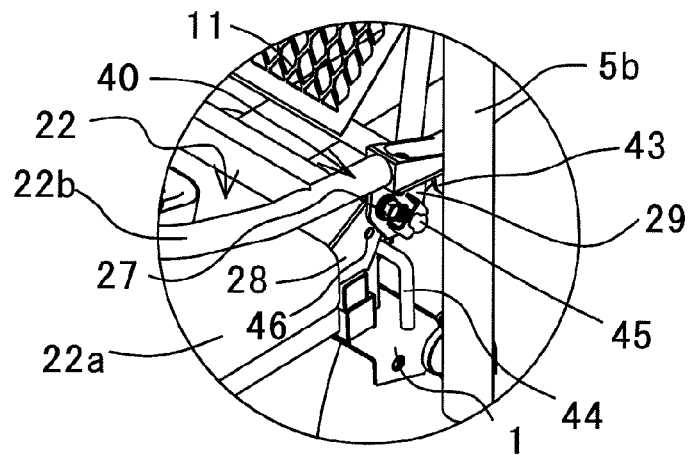
FIG. 17 is a perspective view of the lock mechanism of the rear seat in a stowed state.

The lock pin 45 is supported by the bracket 29 of the backrest 22b. Meanwhile, as shown in FIG. 17, an engagement hole 46 to be engaged with the lock pin 45 at the time of the use state of the seat bottom 22a is formed in the bracket 28 of the seat bottom 22a.

Figure 18:
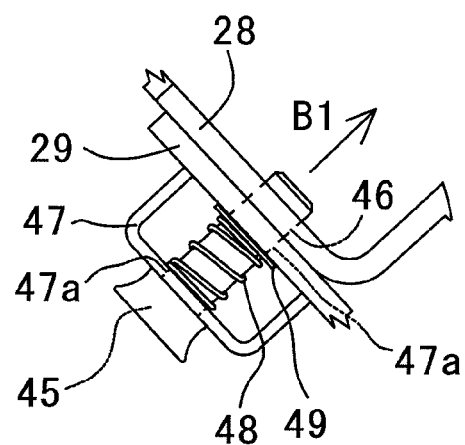
FIG. 18 is an enlarged side view of a lock pin of the lock mechanism of the rear seat.

FIG. 18 is an enlarged sectional view of the lock pin 45. A U shape pin support base 47 is secured to the bracket 29 of the backrest 22b, and the lock pin 45 is inserted into pin holes 47a formed in the pin support base 47 and the bracket 29 movably in the lateral direction. The lock pin 45 is biased in the lock direction B1 (inward in the vehicle width direction) by a coil spring 48 compressed and provided in the pin support base 47 via a spring seat 49. That is, when the backrest 22b is pivoted with respect to the seat bottom 22a as in FIG. 10 and the lock pin 45 is brought to a position corresponding to the engagement hole 46 of the seat bottom side bracket 28 as in FIG. 18, by elastic force of the coil spring 48, the lock pin 45 automatically runs into the engagement hole 46, and the seat bottom 22a in the use state is locked with respect to the backrest 22b in the state of FIG. 10.

[Configuration of Seatbelt Apparatuses 34, 35 of Rear Seat 22]

Figure 5:
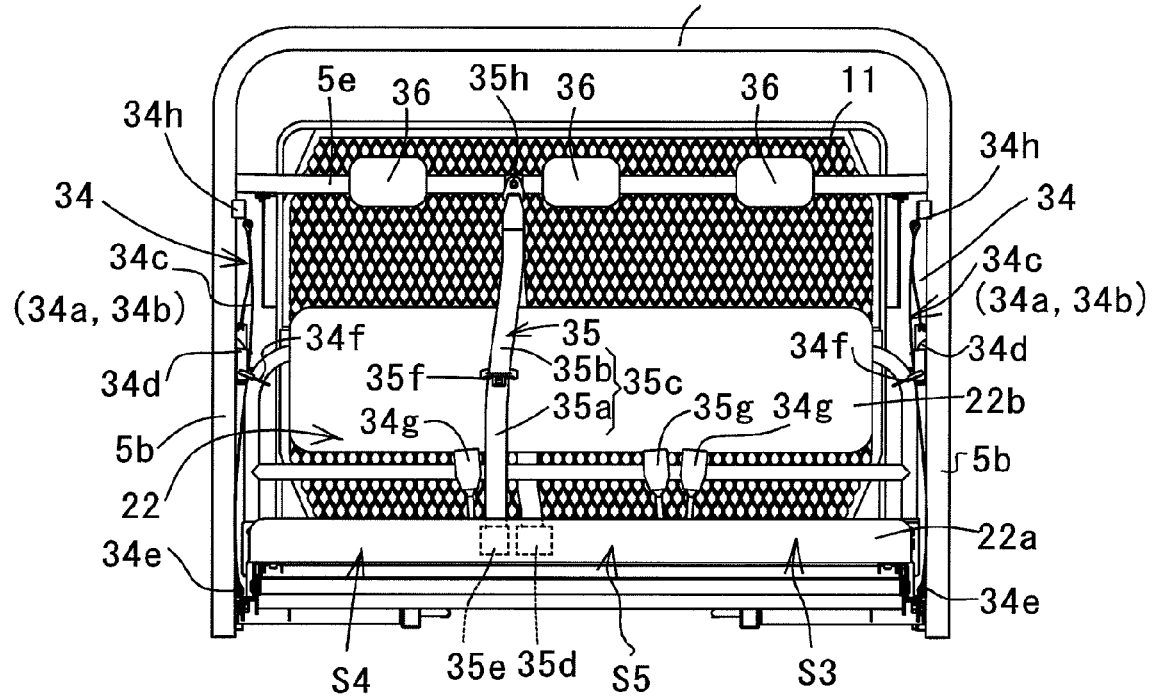
FIG. 5 is a front view of a rear seat at the time of non-seating.
Figure 6:
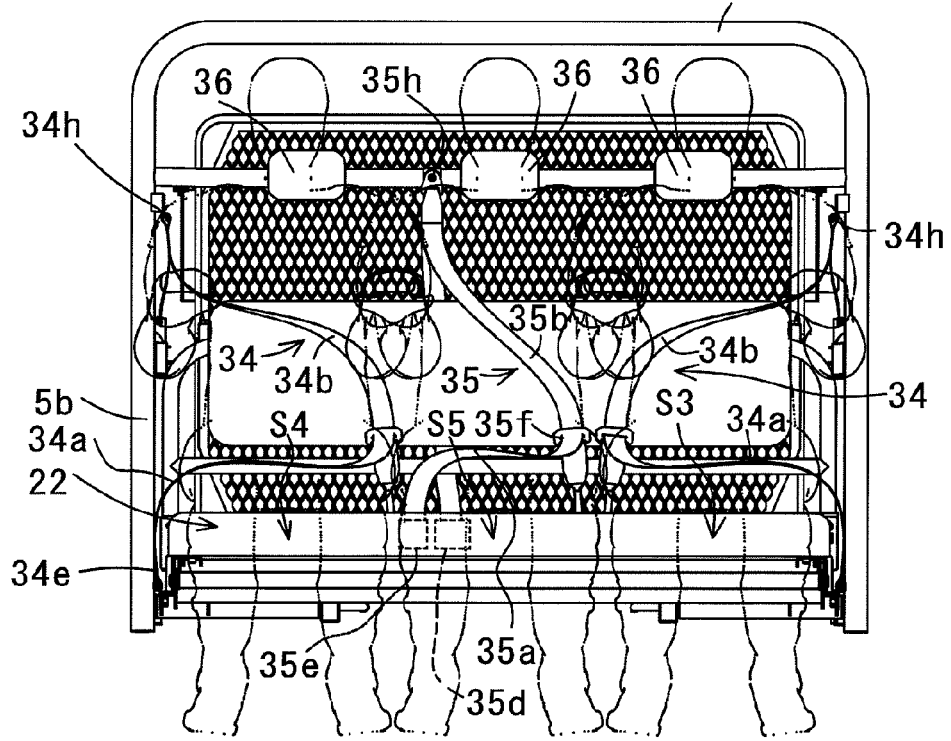
FIG. 6 is a front view of the rear seat at the time of seating.

FIG. 5 is a front view of the rear seat 22 in a non-seating state, and FIG. 6 is a front view of the rear seat 22 in a seating state. In FIG. 5, the three point seatbelt apparatus 35 for the central seating area S5 of the rear seat 22 is provided with a webbing 35c integrally having a lap belt 35a and a shoulder belt 35b, a retractor 35d provided in the rear end of the seat bottom 22a of the rear seat 22, the retractor for supporting one end of the webbing 35c so as to freely wind the one end, a bottom anchor 35e provided in the rear end of the seat bottom 22a of the rear seat 22, the bottom anchor for supporting the other end of the webbing 35c, a tongue plate 35f installed in the middle of the webbing 35c, a buckle 35g provided in the seat bottom 22a and detachably coupled to the tongue plate 35f, and a top anchor 35h for supporting the shoulder belt 35b.

The top anchor 35h of the three point seatbelt apparatus 35 of the central seating area S5 is provided on the cross member 5e formed in a rear end of the ROPS 5. The top anchor 35h slidably supports the webbing 35c extending upward from the retractor 35d on the rear side of the backrest 22b, and folds the webbing 35c downward along the front side of the backrest 22b.

The top anchor 35h, the bottom anchor 35e and the retractor 35d of the central seating area S5 are arranged on the opposite side of the driver seat side (that is, the right side) of the front seat 21 with respect to the central seating area S5. Therefore, in the non-seating state, the entire webbing 35c is positioned on the right side of the central seating area S5.

Each of the three point seatbelt apparatuses 34 of the left and right seating areas S3, S4 of the rear seat 22 has the same structure as the three point seatbelt apparatus 35 of the central seating area S5 except for a structure that a top anchor 34h and a retractor 34d are attached to the rear vertical member 5b of the ROPS 5. That is, a structure and attachment of a webbing 34c integrally having a lap belt 34a and a shoulder belt 34b, the retractor 34d, a bottom anchor 34e, a tongue plate 34f, and a buckle 34g are the same as the three point seatbelt apparatus 35 of the central seating area S5.

[Configuration of Seatbelt Apparatus 33 of Front Seat 21]

In FIG. 1, the two three point seatbelt apparatuses 33 of the front seat 21 have the same structure as the left and right three point seatbelt apparatuses 34 of the rear seat 22.

[Configuration of Screen 11]

Figure 7:
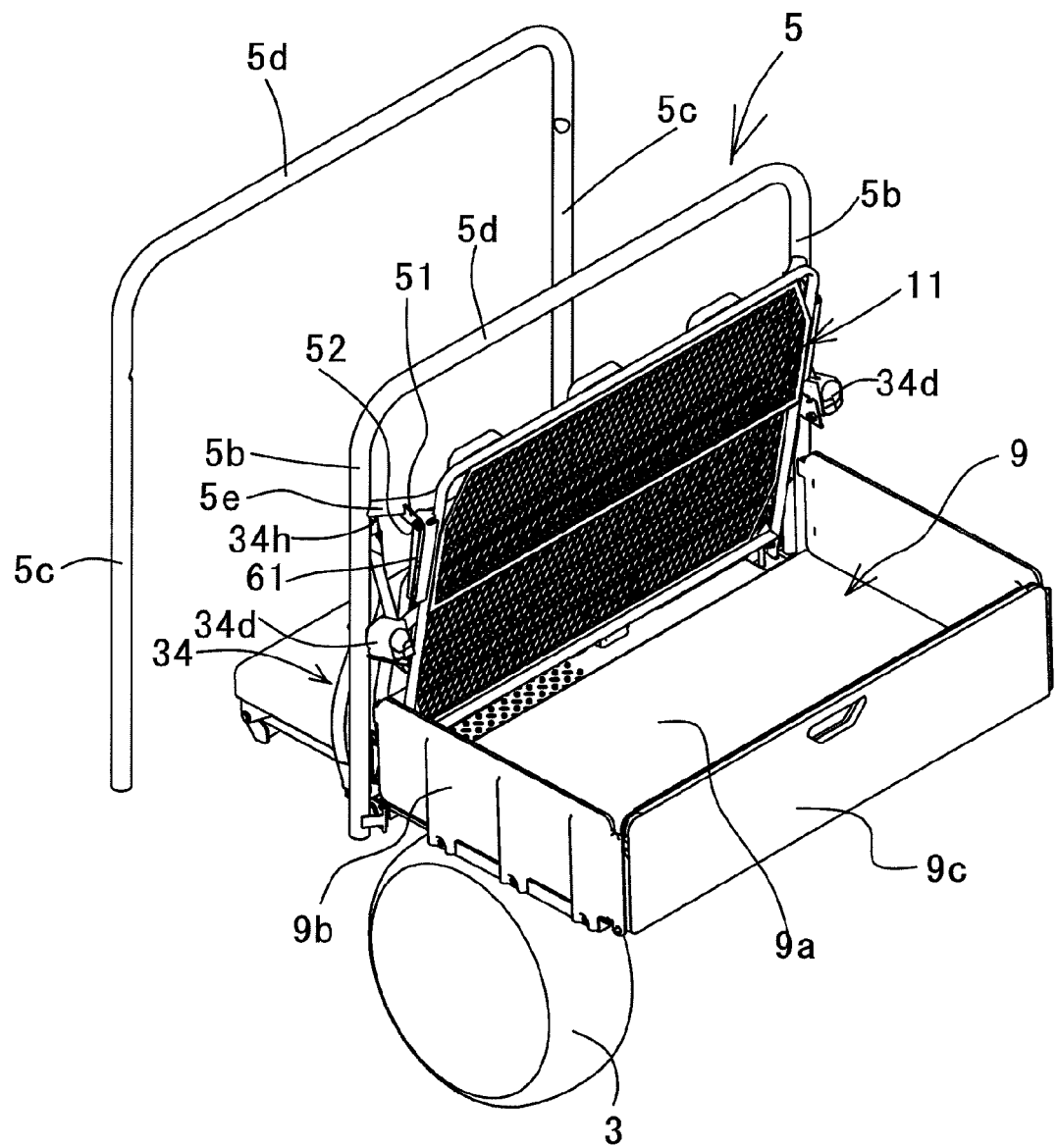
FIG. 7 is a perspective view of the rear seat, a screen and the cargo bed at the time of the non-expansion of the cargo bed when seen from the rear upper side.
Figure 8:
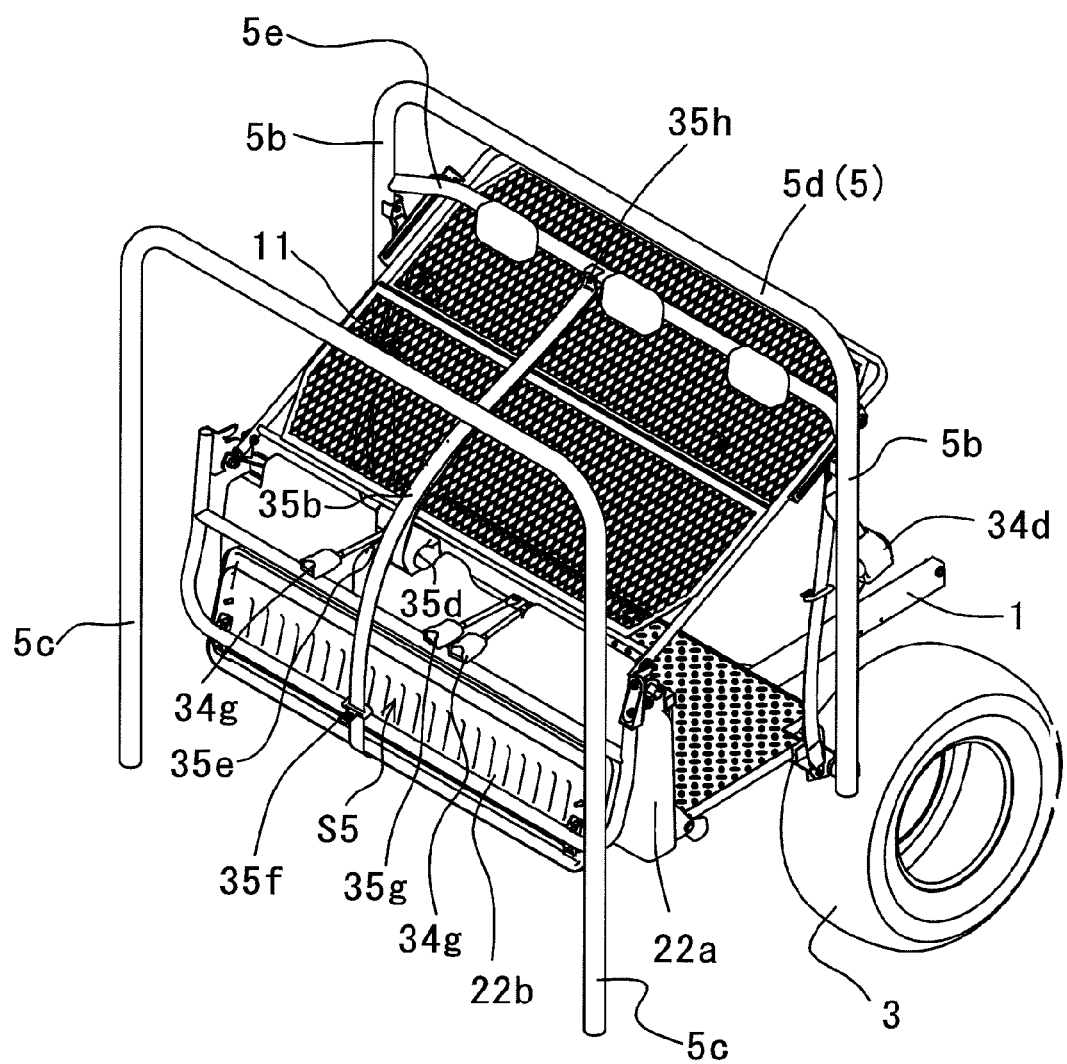
FIG. 8 is a perspective view of the rear seat, the screen and the cargo bed at the time of the expansion of the cargo bed when seen from the front upper side.

FIG. 7 shows a state that the screen 11 is placed at a first position, and FIG. 8 shows a state that the screen 11 is placed at a second position. As shown in FIG. 7, left and right ends of the screen 11 are supported by a pair of left and right support brackets 51 provided on the cross member 5e of the ROPS 5 pivotably via guide pins 52 and linearly movably along the screen longitudinal direction (the longitudinal direction of guide grooves 61 described later). By pivoting the screen 11 on the guide pins 52 and linearly moving the screen along the screen longitudinal direction with respect to the guide pins 52 (described in detail later), a position of the screen 11 is changeable between the first position for partitioning the cargo bed 9 in the non-expanded state and the rear seat 22 in the use state as shown in FIG. 7 and the second position for covering the cargo bed 9 in the expanded state and a front part in an inclination posture as shown in FIG. 8.

Figure 9:
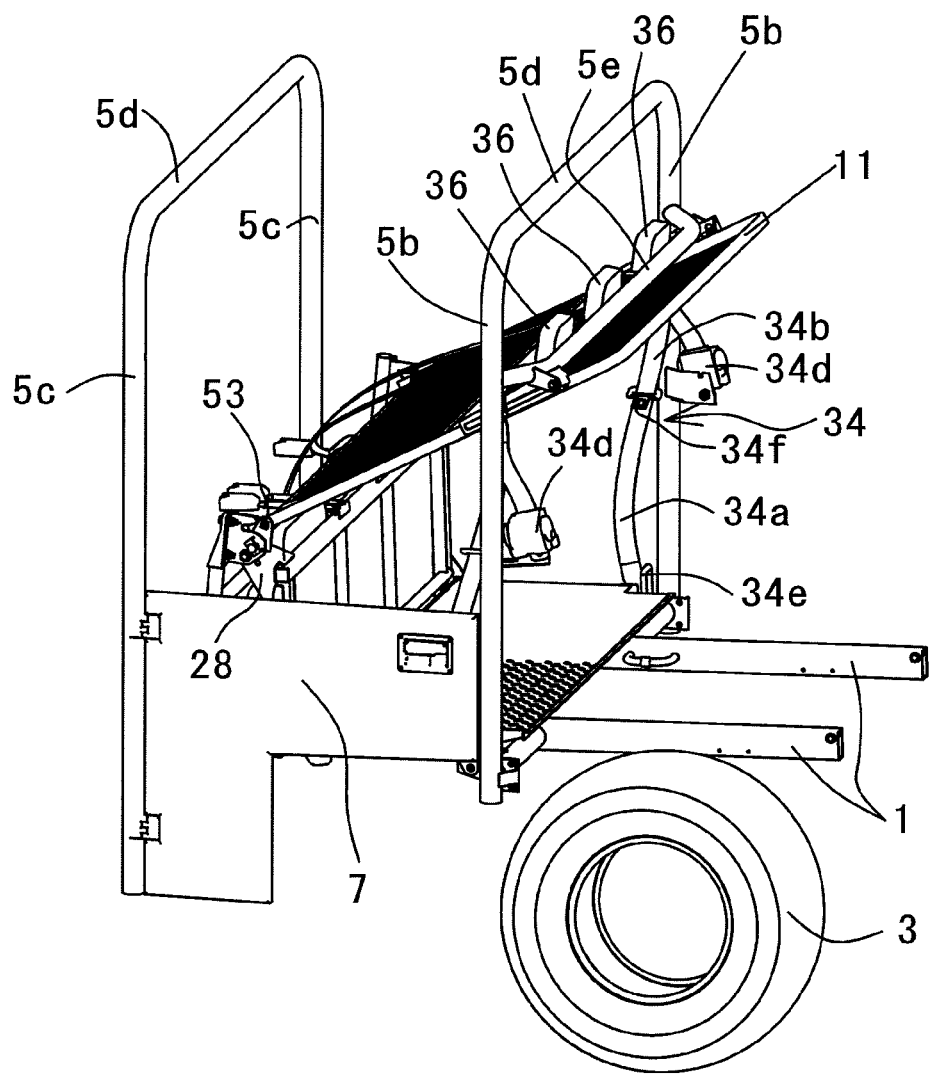
FIG. 9 is a perspective view of the rear seat, the screen and the cargo bed at the time of the expansion of the cargo bed when seen from the rear upper side.
Figure 11:
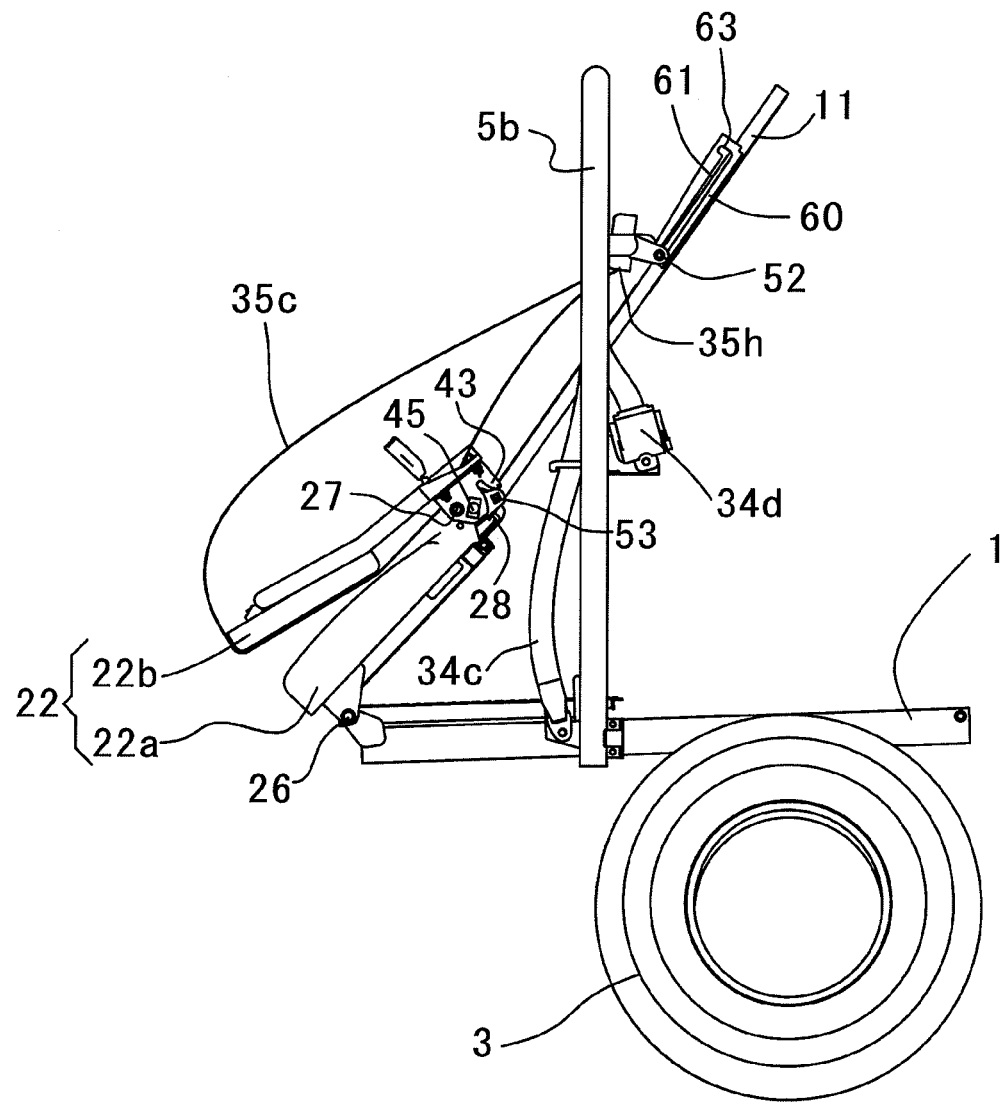
FIG. 11 is a left side view of the rear seat and the screen in the middle of the expansion of the cargo bed.

In FIGS. 9 and 11, a lower end of the screen 11 is coupled to the bracket 28 provided in the rear end of the seat bottom 22a of the rear seat 22 pivotably via hinge pins 53. Thereby, the lower end of the screen 11 is movable together with the rear end of the seat bottom 22a of the rear seat 22.

In a case where the screen 11 is placed at the first position as shown in FIG. 7, the screen 11 is maintained in a substantially upright state at a position in the front and rear direction which is substantially the same as the rear vertical members 5b of the ROPS 5. Meanwhile, in a case where the screen 11 is placed at the second position as shown in FIG. 8, the lower end of the screen 11 is moved front-upward together with the rear end of the seat bottom 22a of the rear seat 22, and the entire screen 11 is inclined so as to extend front-downward from the cross member 5e.

Figure 19:
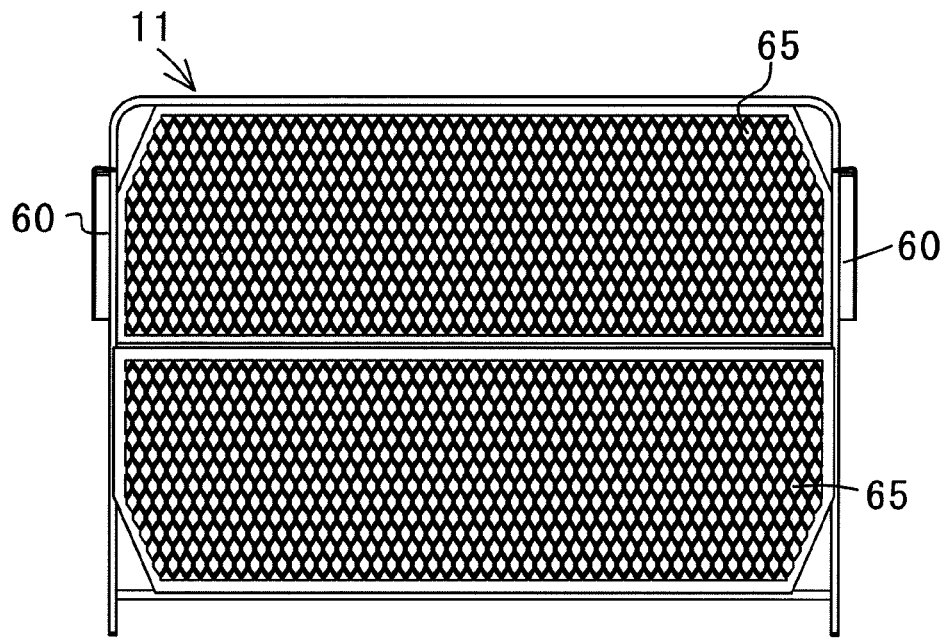
FIG. 19 is a front view of the screen at a first position.
Figure 20:
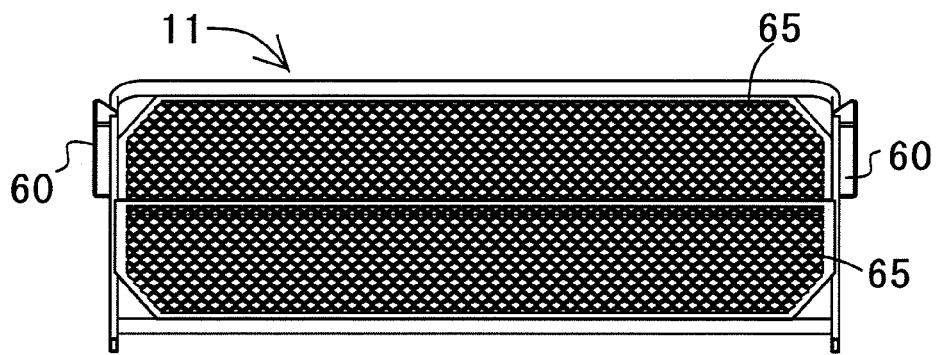
FIG. 20 is a front view of the screen at a second position.

FIG. 19 is a front view of the screen 11 at the first position, and FIG. 20 is a front view of the screen 11 at the second position. In FIG. 19, a large number of diamond shape openings 65 are formed over the substantially entire surface of the screen 11, and the rear side can be visually recognized through the openings 65. The openings 65 are elongated in the up and down direction. Therefore, even when the screen 11 is inclined to the second position as in FIG. 20, the rear side can be visually recognized from the diamond shape openings 65.

[Guide Mechanism 42 of Screen 11]

Figure 12:
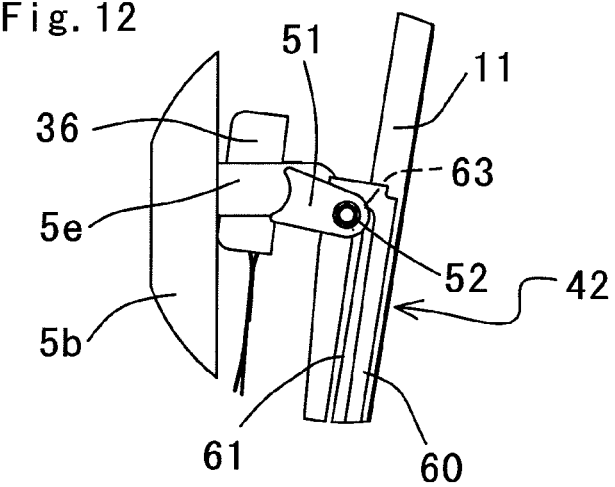
FIG. 12 is a left side view of a guide mechanism of the screen at the time of the non-expansion of the cargo bed.
Figure 13:
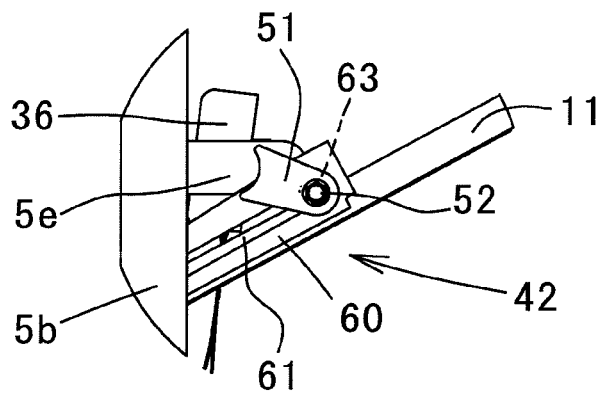
FIG. 13 is a left side view of the guide mechanism of the screen in the middle of the expansion of the cargo bed.
Figure 14:
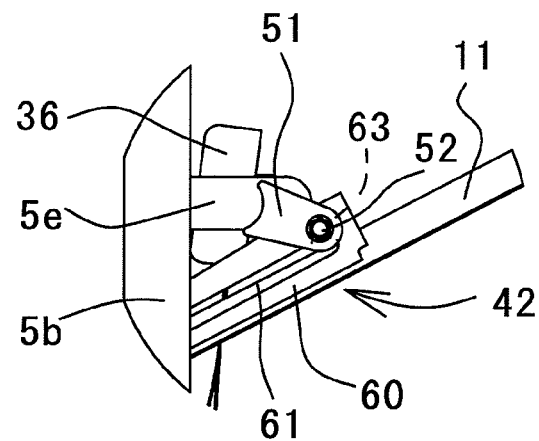
FIG. 14 is a left side view of the guide mechanism of the screen at the time of the expansion of the cargo bed.

FIGS. 12 to 14 show a detail of a guide mechanism 42 of the screen 11. In FIG. 12, guide plates 60 are respectively secured to left and right side surfaces of the screen 11, and the guide grooves 61 extending along the screen longitudinal direction are respectively formed in the guide plates 60. As described above, the guide grooves 61 are engaged with the guide pins 52 provided on both left and right ends of the cross member 5e via the brackets 51 movably in the screen longitudinal direction and pivotably. Further, as shown in FIG. 11, locking recess portions 63 bent at a substantially right angle with the substantially screen longitudinal direction from upper ends of the guide grooves 61 are formed in the guide plates 60.

The locking recess portions 63 are engaged with the guide pins 52 even in a case where the screen 11 is placed at any of the first position shown in FIG. 3 and the second position shown in FIG. 4. Specifically, size is set in such a manner that a distance L1 from the guide pin 52 of the cross member 5e to the hinge pin 53 of the lower end of the screen when the screen 11 is placed at the first position as in FIG. 3 matches with a distance L2 from the guide pin 52 to the hinge pin 53 of the screen when the screen 11 is placed at the second position as in FIG. 4.

When the screen 11 is placed at the first position as in FIG. 3, the seat bottom 22a of the rear seat 22 in the use state is fixed by the screen 11. Meanwhile, when the screen 11 is at the second position as in FIG. 4, the seat bottom 22a of the rear seat 22 in the stowed state is fixed by the screen 11.

Tasks relating to stowing of the rear seat 22, expansion of the cargo bed 9, and movement of the screen 11 will be described.

(1) Case where the rear seat 22 is in the use state as in FIG. 3

As shown in FIG. 6, three passengers can be seated on the rear seat 22 in the use state (the state that the passengers can be seated) shown in FIG. 3. The passenger seated in the central seating area S5 can put on the three point seatbelt apparatus 35 as well as the passengers seated in the left and right seating areas S3, S4. Moreover, since the top anchor 35h is provided on the cross member 5e at the position lower than the upper end beam members 5d of the ROPS 5, the shoulder belt 35b of the central seating area S5 is not uselessly long.

As in FIG. 15, the backrest 22b of the rear seat 22 is locked in the standing state with respect to the vehicle body frame 1 by engagement between the hook 43 and the anchor 44, and the seat bottom 22a of the rear seat 22 is locked to the backrest 22b by the lock pin 45. Further, as in FIG. 12, the screen 11 is locked at the first position by fitting the guide pin 52 to the locking recess portion 63 of the guide groove 61. Thus, the screen 11 is not shaken or the seat bottom 22a of the rear seat 22 is not floated up, so that ride quality of the rear seat 22, can be favorably maintained.

(2) Case where the rear seat 22 is changed from the use state of FIG. 3 to the stowed state of FIG. 4

Figure 10:
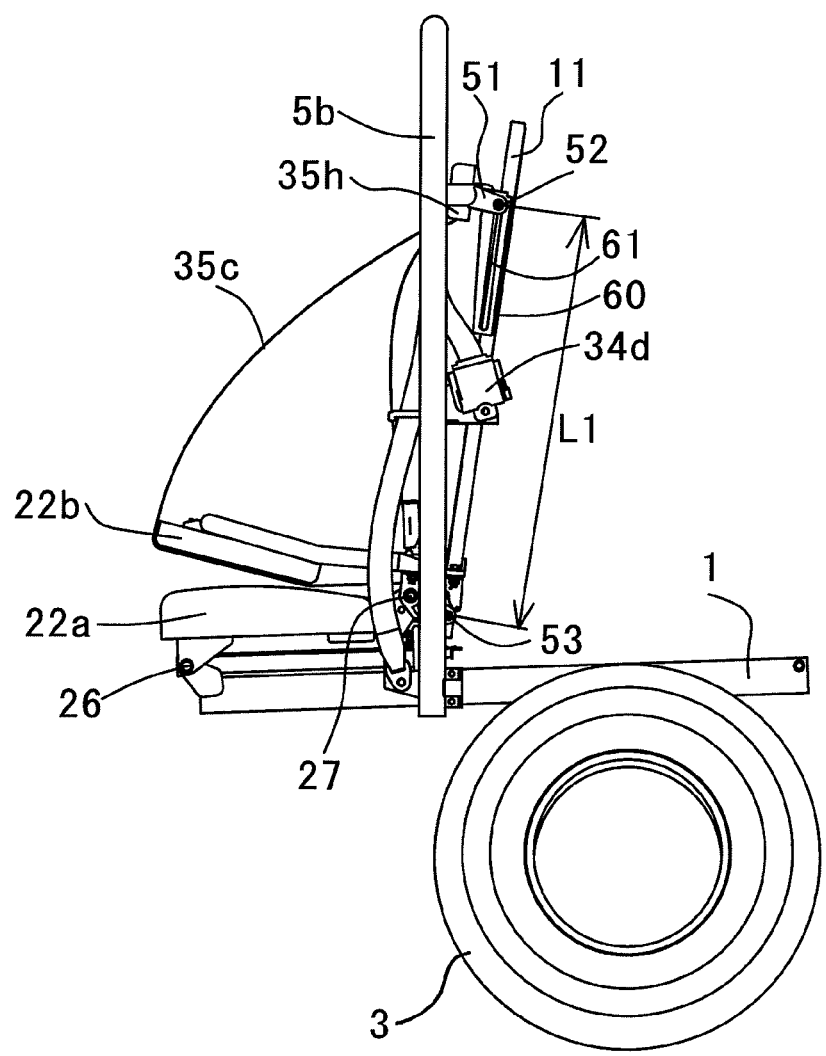
FIG. 10 is a left side view of the rear seat and the screen at the time of the non-expansion of the cargo bed.
Figure 16:
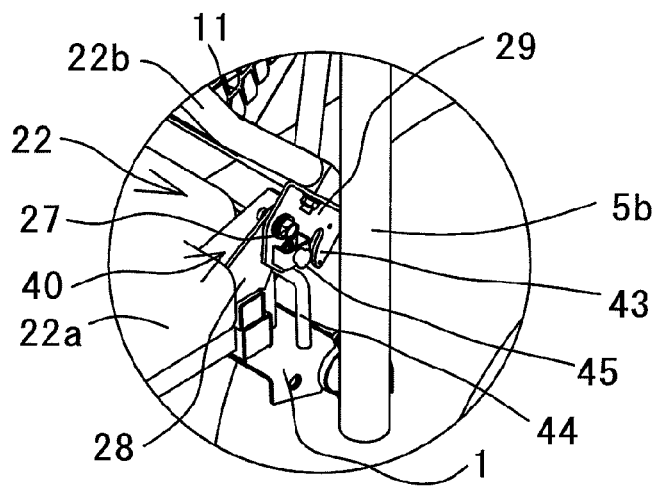
FIG. 16 is a perspective view of the lock mechanism of the rear seat in the middle of a stowing task.

In the lock mechanism 40 in a state of FIG. 15, firstly, by pulling the lock pin 45 leftward, lock between the backrest 22b and the seat bottom 22a is cancelled. After that, the backrest 22b is pivoted front-downward on the rear hinge 27 as shown in FIG. 10 and disposed on a surface of the seat bottom 22a. By folding the backrest 22b, as shown in FIGS. 16 and 17, the hook 43 of the backrest 22b is automatically removed from the anchor 44, and lock of the backrest 22b to the vehicle body frame 1 is cancelled.

Next, in FIG. 12, the guide pin 52 is removed from the locking recess portion 63 of the guide plate 60 of the screen 11, and the seat bottom 22a is pivoted front-upward on the front hinge 26 as shown in FIG. 11. In accordance with pivoting of the seat bottom 22a, the screen 11 is pivoted forward on the guide pin 52, and moved in the screen longitudinal direction (the longitudinal direction of the guide groove 61) with respect to the guide pin 52. Thereby, the lower end of the screen 11 is moved front-upward together with the rear end of the seat bottom 22a.

(3) Case where the rear seat is changed to the stowed state of FIG. 4

As in FIG. 4, when the rear seat 22 is stowed, the locking recess portion 63 of the guide groove 61 is fitted to the guide pin 52 again as in FIG. 14 from a state of FIG. 13. Thereby, the screen 11 is locked at the second position as in FIG. 8. By the screen 11 locked at the second position, the seat bottom 22a of the rear seat 22 is automatically locked in the standing state (stowed state).

In FIG. 8, the webbing 35c of the central seating area S5 is extended rear-upward along a front surface of the screen 11 from the retractor 35d of the rear end of the seat bottom 22a, folded downward by the top anchor 35h, extended front-downward along the front surface of the screen 11 again, brought around an outer peripheral surface of the backrest 22b, and then led to the bottom anchor 35e of the rear end of the seat bottom 22b. In this case, since the top anchor 35h is provided on the cross member 5e on the lower side of the upper end beam members 5d of the ROPS 5, the webbing 35c is not uselessly extended long, so that the retractor 35d can be compactified and the webbing 35c can be prevented from being long.

The webbing 35c (35b and 35a) of the central seating area S5 is placed close to the right side of the central seating area S5. Thus, the webbing does not disturb a driver in the left seating area (driver seat) S1 of the front seat 21.

Although the screen 11 is inclined at the second position, the openings 65 are long holes elongated in the direction orthogonal to the vehicle width direction. Thus, the passenger (driver and passenger) in the front seat 21 can visually recognize the rear side through the openings 65 as shown in FIG. 20.

[Summary of Effects of Embodiment]

Effects of the present embodiment will be briefly summarized as follows.

(1) In the three-seater rear seat 22, the three point seatbelt apparatus 35 is provided in not only the left and right seating areas S3, S4 but also the central seating area S5. Thus, the passenger seated in the central seating area S5 can put on the three point seatbelt apparatus 35 as well as the passengers seated in the left and right seating areas S3, S4.

(2) The top anchor 35h of the central seating area S5 is provided on the cross member 5e on the lower side of the upper end beam members 5d of the ROPS 5 and arranged at a position corresponding to the shoulder or the neck of the passenger. Thus, the webbing 35c is not uselessly long, so that a fixing function by the webbing 35c can be maintained and material cost of the webbing 35c can be reduced. Further, the retractor 35d can be downsized.

(3) The bottom anchor 35e, the top anchor 35h and the retractor 35d of the three point seatbelt apparatus 35 arranged in the central seating area S5 are arranged on the opposite side of the driver seating area (left seating area S1) side in the vehicle width direction of the front seat 21 with respect to the central seating area S5. Thus, when the rear seat 22 is stowed, the webbing 35c of the central seating area S5 is accommodated in a space which is away from the driver, so as not to disturb driving.

(4) An upper part of the screen 11 is supported by the cross member 5e of the ROPS 5. Thus, a support member of the screen 11 and a support member of the top anchor 35h of the seatbelt apparatus 35 can be unified, so that the number of parts is reduced.

(5) The plurality of headrests 36 is provided on the cross member 5e. Thus, a support member of the headrests 36 and the support member of the top anchor 35h of the seatbelt apparatus 35 can be unified, so that the number of parts is reduced.

[Other Embodiments]

(1) In a case where the front seat 21 is three-seater, the top anchor of the three point seatbelt apparatus 33 provided in a central seating area of the front seat can be provided on a cross member which is similar to the cross member 5e of FIG. 6. That is, the cross member is bridged between the intermediate vertical members 5c of FIG. 1 at a position lower than the upper end beam members 5d, and the top anchor is provided on this cross member.

(3) The present invention can also be applied to a vehicle provided with not a bench type seat but an independent type seat.

(4) The present invention is not limited to the structure of the above embodiment but includes various modified examples considered within a range not departing from the content described in the claims.

What is claimed is:

1. A utility vehicle comprising:
   a ROPS including a plurality of frame members surrounding a riding space;
   a front seat and a rear seat arranged in the riding space;
   a cargo bed provided behind the riding space, the cargo bed being changeable between an expanded state in which the cargo bed is expanded forward into the riding space and a non-expanded state in which the cargo bed is not expanded in the riding space; and
   a plurality of seatbelt apparatuses for all passengers including a driver, wherein
   each of the seatbelt apparatuses is a three point seatbelt apparatus including a webbing integrally having a lap belt and a shoulder belt, a bottom anchor, a top anchor, a lower buckle and a retractor, in which the webbing is supported by the bottom anchor, the top anchor and the buckle at three points and one end of the webbing is winded around the retractor, in at least one of the three point seatbelt apparatuses, the top anchor is provided on a cross member extending in the vehicle width direction among the frame members of the ROPS, and an upper part of a screen is supported by the cross member.

2. The utility vehicle according to claim 1, wherein at least one of the front seat and the rear seat has a three-seater structure, and the three point seatbelt apparatus having the top anchor supported by the cross member is arranged in a central seating area among three seating areas of the three-seater seat.

3. The utility vehicle according to claim 2, wherein the three-seater seat is a folding rear seat in which a backrest is capable of being folded so as to overlie a surface of a seat bottom and accommodated at a front position of the rear seat, and the cross member supporting the top anchor is arranged at a position lower than an upper end of the ROPS in a rear part of the ROPS.

4. The utility vehicle according to claim 2, wherein the three-seater seat is the rear seat, and the bottom anchor of the three point seatbelt apparatus arranged in the central seating area of the rear seat is arranged on the opposite side of a driver seating area side in the vehicle width direction of the front seat with respect to the central seating area.

5. A utility vehicle comprising:

a ROPS including a plurality of frame members surrounding a riding space;

a front seat and a rear seat arranged in the riding space;

a cargo bed provided behind the riding space, the cargo bed being changeable between an expanded state in which the cargo bed is expanded forward into the riding space and a non-expanded state in which the cargo bed is not expanded in the riding space; and a plurality of seatbelt apparatuses for all passengers including a driver, wherein each of the seatbelt apparatuses is a three point seatbelt apparatus including a webbing integrally having a lap belt and a shoulder belt, a bottom anchor, a top anchor, a lower buckle and a retractor, in which the webbing is supported by the bottom anchor, the top anchor and the buckle at three points and one end of the webbing is winded around the refractor, in at least one of the three point seatbelt apparatuses, the top anchor is provided on a cross member extending in the vehicle width direction among the frame members of the ROPS, and a plurality of headrests is provided on the cross member.

6. The utility vehicle according to claim 5, wherein at least one of the front seat and the rear seat has a three-seater structure, and the three point seatbelt apparatus having the top anchor supported by the cross member is arranged in a central seating area among three seating areas of the three-seater seat.

7. The utility vehicle according to claim 6, wherein the three-seater seat is a folding rear seat in which a backrest is capable of being folded so as to overlie a surface of a seat bottom and accommodated at a front position of the rear seat, and the cross member supporting the top anchor is arranged at a position lower than an upper end of the ROPS in a rear part of the ROPS.

8. The utility vehicle according to claim 6, wherein the three-seater seat is the rear seat, and the bottom anchor of the three point seatbelt apparatus arranged in the central seating area of the rear seat is arranged on the opposite side of a driver seating area side in the vehicle width direction of the front seat with respect to the central seating area.

* * * * *